June 24, 1924.

E. A. SPERRY

GYROSCOPIC COMPASS

Filed Aug. 23, 1920 2 Sheets-Sheet 1

1,499,321

Inventor
ELMER A. SPERRY.
By Herbert H. Thompson
his Attorney

June 24, 1924.
E. A. SPERRY
GYROSCOPIC COMPASS
Filed Aug. 23, 1920    2 Sheets-Sheet 2
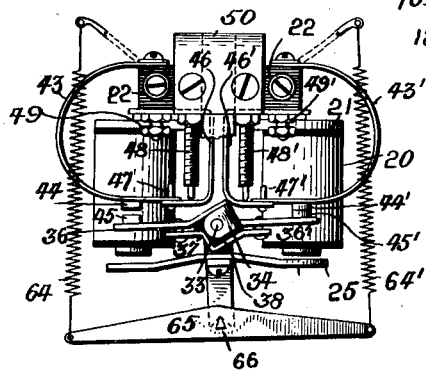
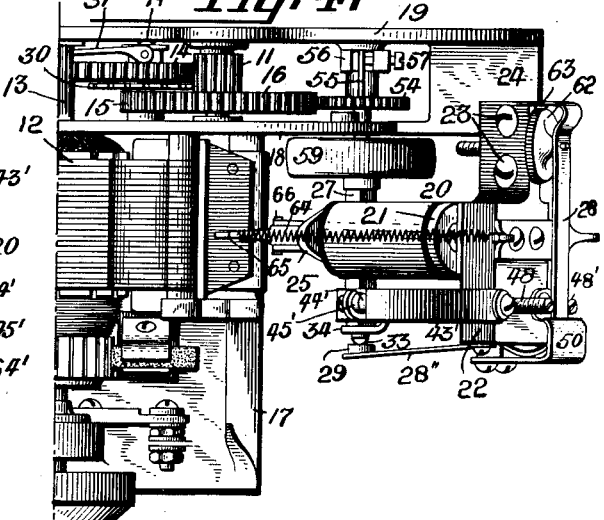
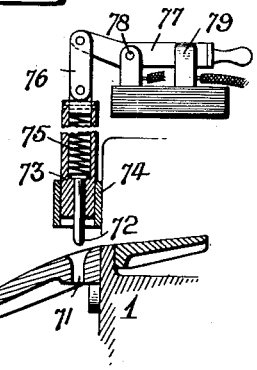
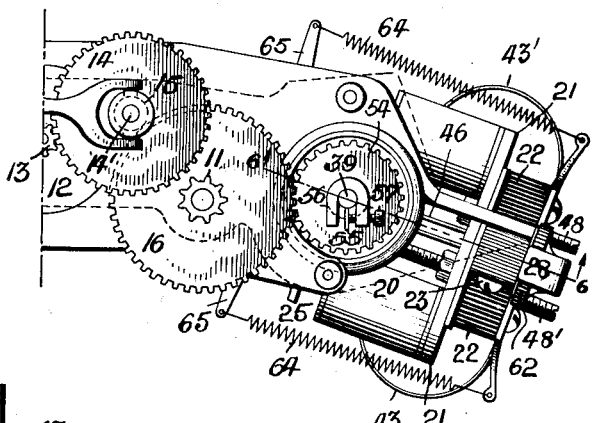
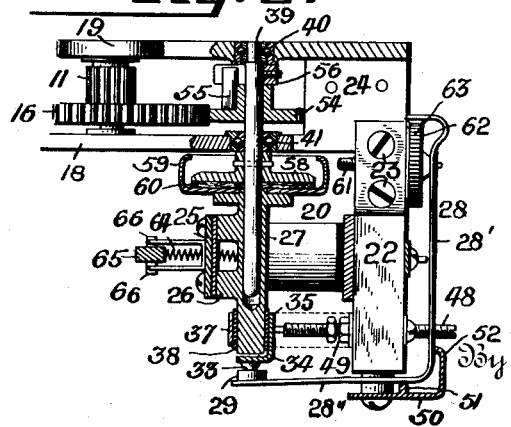
Inventor
ELMER A. SPERRY.
By his Attorney
Herbert H. Thompson Patented June 24, 1924.

1,499,321

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC COMPASS.

Application filed August 23, 1920. Serial No. 405,407.

*To all whom it may concern:*

Be it known that I, ELMER A. SPERRY, a citizen of the United States, residing at Brooklyn, in the county of Kings and State of New York, have invented certain new and useful Improvements in Gyroscopic Compasses, of which the following is a specification.

This invention relates to gyroscopic compasses or other precision instruments wherein a phantom or follow-up element which may or may not carry the compass card is moved to follow the position in azimuth of the sensitive element of the compass. As is well known, the movement of the follow-up element is usually caused by a reversible motor, termed the azimuth motor, controlled preferably through a relay by contacts carried respectively by said follow-up element and the sensitive element. In gyroscopic compasses as at present generally constructed a trolley or brush carried by the sensitive element cooperates with contacts carried by the "phantom" and separated from each other by a small gap of insulation, the arrangement being such that the azimuth motor is driven in one direction or the other depending upon which contact is engaged by the trolley and turns the phantom to cause the insulating gap to lie under the trolley wheel. As said gap is narrow, when the gap is brought opposite the trolley the opposite contact engages the trolley and the motor reverses the phantom to place the original contact in circuit, and thus an oscillation or "hunting" of the phantom is produced for the purpose of eliminating static friction between the sensitive element and its suspension bearing. Preferably a relay is employed between the contacts and the motor to make the hunting action positive, as it is found that this action is very important for the successful operation of a gyroscopic compass. It is found that the constant breaking of contact between the trolley and the aforesaid contacts frequently results in objectionable sparking at the trolley, causing corrosion and pitting of the trolley and contact blocks.

One of the objects of my invention is to provide means for accomplishing the aforesaid hunting of the phantom without the aid of the trolley, whereby the aforesaid sparking is avoided, while at the same time the trolley causes movement of the phantom to bring the insulating gap opposite the trolley whenever sufficient relative movement between the phantom and sensitive element occurs, as when the vessel on which the compass is mounted changes her course. By the means which I have provided current flows through the trolley only when relative movement between the sensitive element and phantom greater than the degree of hunt takes place, and the hunting is accomplished independently of said trolley. Furthermore, a finer and more readily adjustable degree of hunt than was formerly available can be obtained by means of my invention.

A further object is the provision of simple and reliable means for accomplishing the aforesaid function, which means may be constructed and arranged as a unit with the azimuth motor so as to be readily attached to and detached from the compass.

Still another object of my invention is to provide means in connection with gyroscopic compasses having unstable or top heavy characteristics, such as of the type shown in the British Patent No. 131,987 of September 1, 1919, for locking the gyro casing against movement about a horizontal axis until the gyro rotor has attained sufficient speed to maintain the casing in a fixed position with relation to said axis. For this purpose I have provided a locking means so connected with a switch for placing into and out of action the parts which control the azimuth motor that when said switch is operated to bring said parts into operation the gyro is unlocked, and conversely, when said parts are placed out of operation said gyro casing is automatically locked against movement about said horizontal axis.

Other objects and advantages will become apparent as the description of the invention is hereinafter developed.

Referring to the drawings wherein I have shown what I now consider to be the preferred forms of my invention:

Fig. 3 is a plan view of the relay and certain parts associated therewith for controlling the azimuth motor.

Fig. 4 is a side elevation of the parts of Fig. 3 in connection with the azimuth motor.

Fig. 5 is a plan view of the parts shown in Fig. 4.

Fig. 6 is a vertical sectional view taken on line 6—6 of Fig. 5.

Fig. 7 is a view of a detail.

Figures 2, 8:
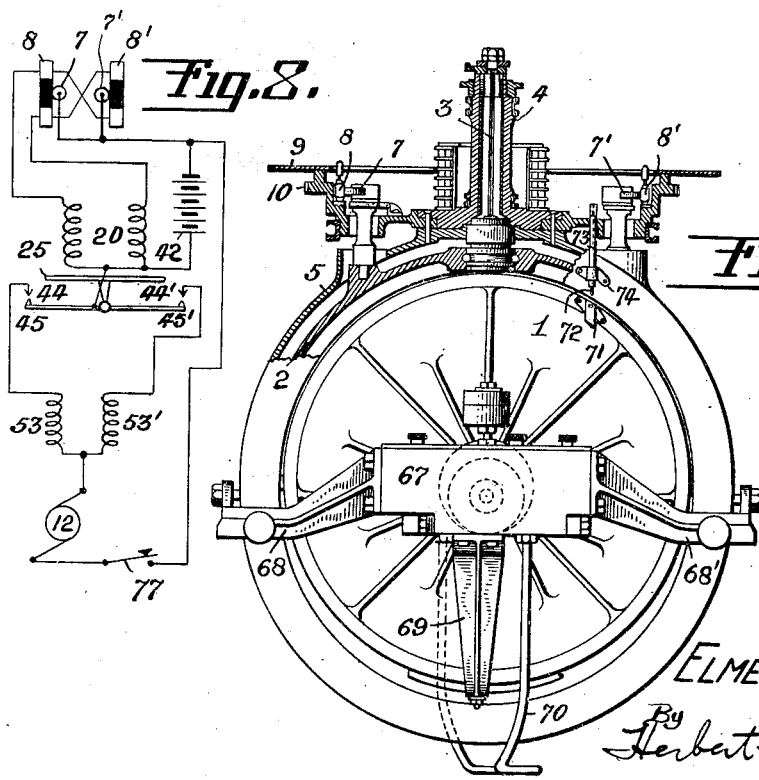
Fig. 2 is a side elevation, partly in vertical section, of certain parts of the compass detached from their mounting.
Fig. 8 is a wiring diagram.

Reference numeral 1 designates the gyro casing which contains the gyro rotor and is mounted in the usual manner for movement about a horizontal axis within the vertical ring 2. Said rotor, casing, and ring constitute the sensitive element above mentioned. The vertical ring is suspended by one or more wires 3 from the stem 4 of the phantom or follow-up element 5 and is movable about a vertical axis within said phantom. The phantom is in turn supported in the usual manner for movement about a vertical axis within the spider 6. The vertical ring 2 carries a pair of trolleys 7, 7' which project through apertures in the phantom and are adapted to engage contact elements 8, 8' carried by said phantom. Each of said contact elements comprises a pair of contacts separated by insulation as shown in Fig. 8 and as will be readily understood by those skilled in the art. The structure above described is well known in the art and is shown for example in the U. S. patent to E. A. Sperry, No. 1,279,471, September 17, 1918, and in the British patent previously referred to.

The phantom element 5 carries the compass card 9 and is also provided with an annular gear 10 adapted to be engaged by a pinion 11 driven by azimuth motor 12 in any suitable manner, as through reduction gearing 13, 14, 15, 16. Gear 14 may be mounted rotatably with respect to its shaft 14' and may be slidable thereon to bring projections (not shown) on said gear into engagement with the teeth of a wheel 30 fixed to said shaft, a pivoted arm 31 adapted to be moved by an electromagnet 32 being provided for sliding said gear. This structure is also well known in the art and need not be further described here.

The azimuth motor and gearing may be supported in the usual manner from the rim of spider 6. As shown, said motor is mounted on a suitable plate 17 adapted to be secured to spider 6 and said gear are shown positioned between plates 18 and 19 connected to said plate. A relay 20 comprising a pair of electromagnets is shown carried by a plate 21 attached to a suitable base 22 of bakelite or other insulating material. The latter may be attached by screws 23 to a member 24 formed integral with or otherwise connected to plates 18 and 19.

Relay 20 is adapted when energized to attract an armature 25, which armature may be secured by screws to suitable lugs 26 extending from a hollow shaft 27. For supporting said shaft I have shown a resilient member 28 supported from insulating base 22 and provided at one end with a bearing 29 adapted to receive a rounded projection 33 on an extension 34 of a member 35 secured to shaft 27. Said member 35 is shown provided with oppositely extending arms 36, 36' and may be secured to shaft 27 by means of a clamp member 37 bolted or otherwise secured to arms 36, 36' so that members 35 and 37 surround shaft 27 and are rigidly attached thereto. Suitable insulating material 38 is interposed between shaft 27 and said members 35, 37. The member 28 is shown as comprising portions 28', 28'' substantially at right angles to each other whereby said member extends from one side of base 22 around an end portion thereof. A member 50 is secured to said end of base 22 and is provided with projections 51, 52, which engage portions 28', 28'', respectively, of member 28 and hold said portions adjacent said base. A shaft 39, journaled at one end in an anti-friction bearing 40 in plate 19 and at its intermediate portion in a similar bearing 41 in plate 18 extends in alignment with shaft 27 and projects, as shown, into the hollow portion of said shaft.

As shown in Fig. 8, the magnet coils of relay 20 are connected at one end, respectively, to the segments of contact element 8 and also to coresponding segments of contact 8'. At their other end said coils are connected to one pole of a source of E. M. F., such as a battery 42, the other pole of said battery being connected with trolleys 7 and 7'. As will be apparent, movement of the sensitive element of the compass sufficient to bring trolleys 7 and 7' into engagement with the corresponding segments of contacts 8, 8' will result in energization of one or the other of the coils of relay 20, depending upon the direction in which said sensitive element is moved with respect to phantom 5. Armature 25 is thus attracted and tends to rotate shaft 27 in one direction or the other. I have provided means responsive to the attraction of armature 25 for closing a circuit through the azimuth motor to cause said motor to turn the phantom 5 in such a direction as to bring the insulation between the segments of contacts 8, 8' opposite their respective trolleys. One form of such means is shown in Figs. 3, 4, and 5, and may be constructed substantially as follows:

Attached to one face of insulating base 22 are oppositely extending curved members 43, 43', of resilient material, provided with contacts 44, 44', respectively, arranged to cooperate with contacts 45, 45' mounted on the respective arms 36, 36' adjacent the ends thereof. Spring members 46, 46' are suitably attached to member 22 and are provided with oppositely extending end portions carrying pins or projections 47, 47' over which pins extend the free end portions of spring members 43, 43', respectively, said portions being suitably slotted for this purpose. Members 46, 46' thus form supports for the free end portions of members 43, 43'. For adjusting the distance through which either of contacts 45, 45' must pass in order to engage the corresponding contact 44, 44' I have shown screws 48, 48' threaded through insulating base member 22 and extending into contact with the oppositely extending end portions of members 46, 46', respectively. Obviously, when, for instance, screw 48 is turned in one direction or the other the portion of member 46 carrying pin 47 is moved up or down and the contact 44 on member 43 is moved accordingly. Members 46, 46' are respectively connected, as through binding posts 49, 49' to the oppositely wound fields 53, 53' (see Fig. 8) of azimuth motor 12. Said fields are shown in Fig. 8 as connected through the armature of said motor to one terminal of battery 42, while member 35, and hence contacts 45, 45', are connected to the other terminal of said battery. In this manner, whenever, one of contacts 45, 45' engages the corresponding contact 44, 44', the motor 12 is driven in one direction or the other depending upon which of said contacts are in engagement. The fields 53, 53' and contacts 44, 44' are connected so that when trolleys 7, 7' engage corresponding segments of contacts 8, 8', thereby attracting armature 25 to bring one of contacts 45, 45' into engagement with the corresponding one of contacts 44, 44', motor 12 turns to drive phantom 5 in a direction such as to bring opposite said trolleys the insulation between segments of contacts 8, 8'. Relay 20 is thereupon deenergized.

As has been previously pointed out, in gyro compasses heretofore constructed a hunting or oscillatory movement is imparted to the phantom by means of the trolleys engaging the opposite contact segments when the insulating gaps are moved opposite the trolleys, whereby the azimuth motor is reversed to bring the insulating gaps and the original contact segments into engagement with the trolleys, and this cycle is kept up continuously. I obtain the aforesaid hunting independently of the trolleys and thus avoid the objectionable sparking frequently occurring in the prior constructions. To this end I provide insulating gaps of sufficient breadth between the contact segments to permit the trolleys to move through a certain small angle without coming into contact with said segments. By the means which I have provided, the azimuth motor, after turning through a predetermined angle corresponding to the angle of hunt, is caused to bring one of contacts 45, 45' into engagement with the corresponding one of contacts 44, 44' to reverse said motor. One form which said means may assume may be constructed substantially as shown in Figs. 4, 5, and 6.

Surrounding shaft 39 and rotatable with respect thereto is a gear wheel 54 meshing with gear 16 and provided with a projection 55, which projection extends upwardly between the arms of a horeshoe-shaped member 56 rigidly secured to shaft 39. A screw 57 may be threaded through one of the arms of member 56 to vary the distance through which projection 55 must move before moving shaft 39, to vary the degree of hunt. Turning of shaft 39 is adapted to drive shaft 27 through the medium of a friction clutch comprising a member 58 secured to shaft 39, a member 59 secured to shaft 27, and a washer 60 of cork, fiber, or other suitable material between said members 58 and 59. Member 59 is shown as cup-shaped for the purpose of carrying oil to lubricate the washer 60. The resilient member 28 presses member 59 with sufficient force against washer 60 to cause shaft 27 to be driven by shaft 39 under normal conditions unless one or the other of the coils of relay 21 be energized, whereupon armature 25 will be attracted and held in its attracted position, and turning of shaft 39 will have no effect on shaft 27. For varying the pressure which spring 28 exerts on washer 60, I have provided a screw 61 threaded through base 22 and having at one end a projection which passes through said spring 28 as shown. To said screw is secured a disc 62 having a toothed or knurled edge, with the projections of which a tooth 63 on one end of spring member 28 is adapted to engage to maintain the screw in a definite position. Should it be desired to adjust the pressure exerted by spring member 28 on shaft 27 and washer 60, tooth 63 may be removed from engagement between the teeth of disc 62 and screw 61 may then be turned to move arm 28' of member 28 sufficiently to produce the desired variation of pressure. Tooth 63 may thereupon be released and will snap back into engagement between projections of disc 62.

In order for the hunting of the phantom to be successfully accomplished, means should be provided for insuring that, when one of contacts 45, 45' is engaged with the corresponding contact 44, 44', said contacts will remain closed until the motor causes the opposite contacts to be closed. In order to accomplish this I have shown a pair of springs 64, 64' attached at one end to base 22 and at their other ends to opposite ends of a bar 65 pivoted, as through a knife-edge 66, on a double armed member 67 screwed or otherwise secured to armature 25. From this construction it will be evident that when armature 25 is moved to one side or the other of its central position, as when shaft 27 turns, said springs will tend to hold it in engagement with the core of the corresponding coil of relay 20. The corresponding contacts 44, 45, or 44', 45' will thus be held in positive engagement until shaft 27 is turned in the reverse direction. If desired the contacts 44, 45, and 44', 45' may come into engagement slightly before armature 25 reaches the limit of its movement, as shown in Fig. 3, whereby a good wiping effect is secured.

The operation of the azimuth motor to cause hunting of the phantom and to cause the phantom to follow up the movements of the sensitive element will now be clear. Assume that trolleys 7, 7' are in engagement with the insulating portions of contacts 8, 8' and that contacts 44', 45' have been brought into engagement by motor 12, as shown in Fig. 3. Current is thereby caused to flow through that one of fields 53, 53' which will cause motor 12 to be reversed. Said motor will thereupon turn phantom 5 in the opposite direction until projection 55 strikes one of the projections of member 56 whereupon shafts 39 and 27 will be turned to bring contacts 44 and 45 into engagement. The motor is now caused to reverse the direction of movement of the phantom, and continues turning in such reverse direction until shafts 39 and 27 are turned to once more cause contact 45' to engage with contact 44'. The above mentioned cycle will then be repeated. It will be understood, of course, as has already been pointed out, that the insulating gaps between the contact segments of contacts 8, 8' are of sufficient size to prevent trolleys 7, 7' from engaging with any of said contact segments during the hunting of the phantom. It is found that a finer degree of hunt can be secured by the construction above described than was available where a trolley was depended upon to control the azimuth motor through a relay, since the reversal of said motor can not be accomplished so quickly where a trolley and relay are depended upon. Furthermore since the trolley makes and breaks no contacts during the hunting action, all sparking at the trolley during hunting is avoided.

Assume now that the ship changes its course and thereby brings corresponding segments of contacts 8, 8' opposite trolleys 7, 7'. Thereupon one of the coils of relay 20 is energized and armature 25 is attracted to bring that pair of contacts 44, 45—44', 45' into engagement which will cause motor 12 to turn the phantom to bring the insulating portions of contacts 8, 8' again opposite the trolleys. Sufficient movement of motor 12 in such direction, of course, causes turning of shaft 39 but no motion is communicated thereby to shaft 27 to bring the opposite pair of contacts 44, 45—44', 45' into engagement, for the reason that armature 25 is firmly held in its attracted position by the energized coil of relay 20 and the friction between members 58 and 59 is insufficient to cause turning of shaft 27 when said armature is so held. When the insulating gaps or portions of contacts 8, 8' are again brought opposite trolleys 7, 7', the relay coil aforesaid is deenergized, and the motion of shaft 39 is communicated through members 58, 59 to shaft 27, whereby armature 25 and arms 36, 36' are turned in the opposite direction and the hunting action is resumed.

Figure 1:
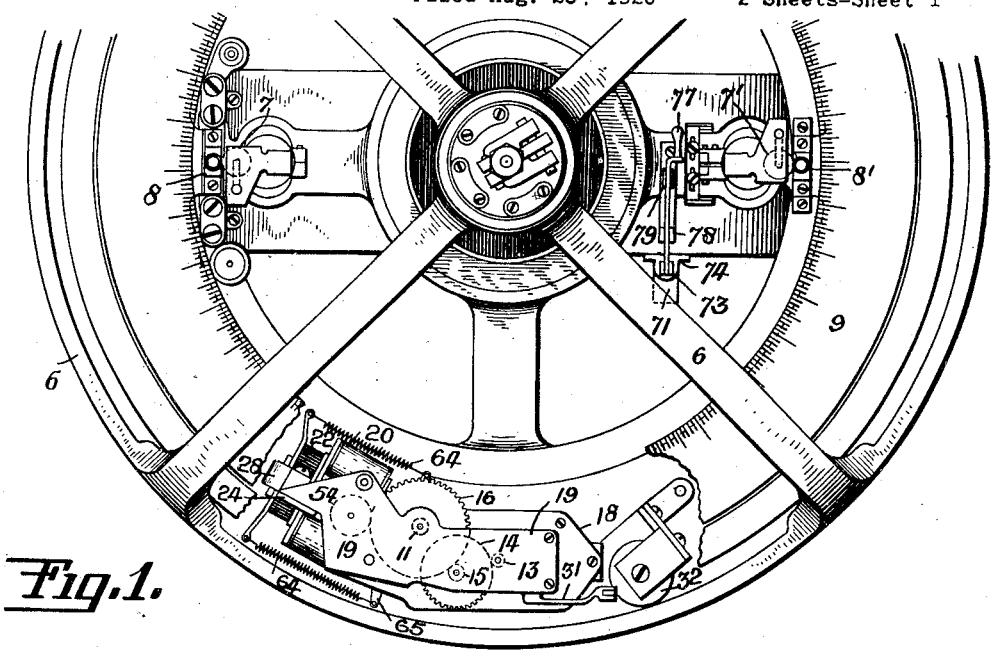
Fig. 1 is a plan view of a portion of a gyroscopic compass, showing my invention applied thereto.

In unstable gyroscopic compasses for instance of the type disclosed in the British Patent 131,987 of September 1, 1919, wherein meridian seeking action of the compass is obtained by a transfer of liquid from one side to another of the gyroscope, any tilting about a horizontal axis would cause the rotor to turn over, if the rotor were not running or had not attained sufficient speed to maintain the said casing normally upright. Such action is highly objectionable since said casing may be tilted until damage to certain parts of the compass results. In Fig. 2, wherein a compass of the type aforesaid is shown, the numeral 67 designates a container for liquid, which container is carried by arms 68, 68' pivoted about a horizontal axis to the phantom 5, and is connected with the gyro casing 1 by means of an arm 69. A pipe 70 connects container 8 with a similar container (not shown) supported in a similar manner on the other side of the gyroscope casing. This structure and the operation thereof is disclosed fully in the British patent above referred to and need not be further described here. It will be clear, however, that if the gyro rotor has not reached a sufficient speed of rotation, tilting of the casing 1 about its horizontal axis will result in a flow of liquid from the higher to the lower side of the casing, and this will cause further tilting of said casing so that not only must the casing be restored to its original position but the tilting may bring some part of the connections of the liquid containers into contact with the phantom and damage may result. In order to avoid this and to retain the gyro casing in a fixed position about its horizontal axis until the gyro rotor has been brought up to sufficient speed I have provided the means shown in Figs. 1, 2, and 7 and constructed substantially as follows:

Casing 1 is provided with the socket 71 adapted to receive a slidable pin 72 mounted within a plunger casing 73 which is slidable in a bearing 74 on the phantom. A coiled spring 75 interposed between the head of pin 72 and the top of plunger casing 73 normally presses said pin into the position shown in Fig. 7. The plunger casing 73 is connected at its upper end by a link 76 with a switch 77 pivoted at 78 and adapted to engage a contact 79. While said switch may be placed in the usual transmitter-repeater circuit commonly used with gyro compasses, I have shown it in the azimuth motor circuit as indicated in Fig. 8. As long as switch 77 is open, it will readily be seen that plunger 73 and pin 72 are depressed to lock the casing 1 against tilting. When, however, switch 77 is closed pin 72 is withdrawn from engagement with socket 71 and the gyro casing is unlocked from the phantom. Since the switch 77 is not closed to throw the azimuth motor circuit into operation until the gyro rotor has been brought to sufficient speed to maintain the gyro casing in a substantially fixed position in azimuth and about the horizontal axis, said gyro casing will remain locked about its horizontal axis until sufficient speed of the gyro rotor is obtained. Also, when the compass is placed out of operation and switch 77 is opened, the casing 1 is automatically locked about its horizontal axis. Spring 75 is provided to permit switch 77 to be opened even though the casing 1 should be tilted so that the aperture or socket 71 is no longer directly beneath pin 72. Socket 71 is shown flared, so that if casing 1 should be tilted slightly about its horizontal axis pin 72 can still engage said socket to both centralize and lock said casing about said axis. If desired, means may be provided for automatically locking the gyro-casing about its horizontal axis in response to the failure of current in the circuit for driving the gyro-rotor. Since the gyro-rotor possesses great inertia and the gyro-casing is ordinarily exhausted of air, the gyro-rotor may continue rotating for a considerable time at sufficient speed to maintain the gyro-casing in a fixed position, and consequently means may be provided for bringing the aforesaid locking means into action at a predetermined time after the failure of current in the rotor-driving circuit. All of these special locking features, including the locking means itself, are not claimed herein but are described in greater detail and claimed in a divisional application which is about to be filed.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyro-compass, the combination with a sensitive element and a follow-up member, of a plurality of relatively movable contacts, means controlled by said contacts for causing said member to assume a definite position with respect to said element, and means independent of said contacts for oscillating said member.

2. In a precision instrument the combination with a sensitive element and a follow-up member, of a motor for moving said member, means comprising relatively movable contacts for controlling said motor, and means independent of said contacts for causing said motor to impart an oscillatory motion to said member.

3. In a precision instrument, the combination with a movable follow-up element and a motor for moving the same, of means independent of said element for causing said motor to oscillate the same.

4. In a gyro-compass, the combination with a movable follow-up member and a sensitive element, of a motor for moving said member, means controlled by relative movement of said member and element for energizing said motor, and means independent of said member for causing said motor to oscillate the same.

5. In a gyro compass, the combination with a movable follow-up element and a motor for moving the same, of means driven by said motor and independent of said element for reversing said motor.

6. In a gyro compass, the combination with a sensitive element and follow-up member, of a motor for moving said member, means driven by said motor for reversing the same after a given movement thereof, and means controlled by relative movement of said member and element for rendering said first named means unresponsive to movement of said motor.

7. In a gyro compass, the combination with a movable follow-up member and a sensitive element, of a motor for driving said follow-up member, means comprising contacts for varying the direction of movement of said motor, a relay having an armature connected to said contacts, means called into action by relative movement between said member and element for energizing said relay, connections between said motor and said contacts for reversing said motor after a predetermined movement thereof, and means for preventing movement of said contacts by said motor when said relay is energized.

8. In a precision instrument, the combination with a sensitive element and a follow-up support therefor, of means for normally causing said support to follow the rotation of the element, and additional means for causing a continuous oscillatory movement between said element and support.

9. In a precision instrument, the combination with a sensitive element and a follow-up support therefor, of means for normally causing said support to follow the rotation of the element, additional means for causing continuous oscillatory movement between said element and support, and a common motive means controlled by said two means.

10. In gyroscopic apparatus, the combination with a movable follow-up member and a sensitive element, of a motor for driving said follow-up member, driving connections between said motor and element, means for reversing said motor and a lost-motion device in said connections.

11. In gyroscopic apparatus, the combination with a sensitive element and follow-up member, a motor for driving said member, means driven by said motor for reversing the same after a predetermined movement in one direction, and means controlled by the relative position of said element and member for controlling the direction of rotation of said motor independently of said first mentioned means.

12. In gyroscopic apparatus, the combination with a sensitive element and follow-up member, a motor for driving said member from said element, a relay controlled by the relative position of said member and element for controlling said motor, and means independent of said relay for automatically reversing said motor.

13. In gyroscopic apparatus, the combination with a sensitive element and follow-up member, a motor, contacts on said element and member for controlling the direction of rotation of the motor, driving connections between said motor and member, a relay having an armature connected to said contacts for causing reversal of said motor after a predetermined movement thereof in a given direction, and means for preventing actuation of said contacts by said motor when said relay is energized.

14. In gyroscopic apparatus having a sensitive element and follow-up member, a plurality of relatively movable contacts, a rotatable shaft to which said contacts are connected, a second rotatable shaft, a driving connection between said motor and said second shaft, a friction clutch connecting said shafts and a motor for driving and oscillating said follow-up member and controlled by said contacts.

In testimony whereof I have affixed my signature.

ELMER A. SPERRY.